United States Patent [19]

Hergesheimer

[11] Patent Number: 5,790,085
[45] Date of Patent: Aug. 4, 1998

[54] PORTABLE INTERACTIVE HEADS-UP WEAPONS TERMINAL

[75] Inventor: Peter D. Hergesheimer, La Habra, Calif.

[73] Assignee: Raytheon Company, Lexington, Mass.

[21] Appl. No.: 746,134

[22] Filed: Nov. 6, 1996

Related U.S. Application Data

[63] Continuation of Ser. No. 325,742, Oct. 19, 1994, abandoned.

[51] Int. Cl.$^6$ ............................................. G09G 5/00
[52] U.S. Cl. ............................ 345/8; 340/980; 349/11; 89/41.07
[58] Field of Search ............................ 345/6–9, 156; 340/980, 853; 434/33, 38; 364/424.06, 423.444; 89/41.07, 41.21; 349/11

[56] References Cited

U.S. PATENT DOCUMENTS

| | | | |
|---|---|---|---|
| 4,145,952 | 3/1979 | Tye | 89/41.07 |
| 4,446,480 | 5/1984 | Breglia et al. | 345/8 X |
| 5,072,218 | 12/1991 | Spero et al. | 340/980 |
| 5,138,555 | 8/1992 | Albercht | 364/424.06 |
| 5,243,340 | 9/1993 | Norman | 340/953 |
| 5,415,549 | 5/1995 | Logg | 434/38 |

FOREIGN PATENT DOCUMENTS

| | | | |
|---|---|---|---|
| 0603092 | 6/1994 | European Pat. Off. | 345/8 |
| 2009984 | 6/1992 | WIPO | 345/156 |

OTHER PUBLICATIONS

I. E Sutherland, A Head–Mounted Three Dimensional Display, Fall Joint Computer Conference 1968, pp. 757–763.
E. deAtley, Computer Constructs 3D Castles in the Air, Electronic Design 19, Sep. 13, 1970, pp. 32–33.
A. Pollack, For Artificial Reality, *Wear a Computer*, The New York Times, Monday, Apr. 10, 1989, pp. D1 and D5.
J. Wright, Altered States, Computer Graphics World, Dec. 1989, pp. 77, 78, 81–83.
H. Rheingold, Virtual Reality, Summit Books, 1991, pp. 79–81 and 104–113.
K. Pimentel et al, Virtual Reality, Windcrest Books, Jan. 1993, pp. 31–41.

*Primary Examiner*—Amare Mengistu
*Attorney, Agent, or Firm*—Leonard A. Alkov; Glenn H. Lenzen, Jr.

[57] ABSTRACT

A weapon terminal that includes a sensor for sensing an orientation of the head of an operator of the weapon terminal, a heads-up display supported by the head of the weapon terminal operator for providing a display image viewable by the weapon terminal operator, a weapon terminal processor responsive to the sensing means and radar track reports for radar detected aircraft for controlling heads-up display to produce a display image that includes symbols representing the radar detected aircraft, wherein symbols are located at positions that represent the positions of the radar detected aircraft in relation to a direction in which weapon terminal operator is facing.

1 Claim, 3 Drawing Sheets

PORTABLE INTERACTIVE HEADS-UP WEAPONS TERMINAL

This is a continuation application Ser. No. 08/325,742 filed Oct. 19,1994 is now abandoned.

BACKGROUND OF THE INVENTION

The disclosed invention relates generally to weapon terminals, and more particularly to an air defense heads-up display weapon terminal.

Hand-held or so-called "manpad" weapon systems have been developed to substantially improve the air defense capabilities of surface-based military units. An example of such manpad weapons systems is the Stinger missile, which is a heat seeking manpad launched guided missile. A weapon alerting and cueing system for a manpad weapon system such as the Stinger missile is commonly comprised of a portable weapon computer terminal and one or more gunner units. The weapon computer terminal is configured to receive radar track reports from a remote radar sensor system and to receive weapon pointing information from the gunner unit. Pursuant to the radar track reports and the weapon pointing information, the portable weapon computer terminal provides cueing information to the gunner unit which controls a cueing sight that visually guides a weapon operator to cue the weapon launcher to a selected radar detected aircraft. Typically, the portable weapon computer terminal is operated by one operator while the weapon launcher units are operated by respective operators. The portable weapon computer terminal and the weapon launcher are interconnected by a cable or by RF modems.

Known portable weapon computer terminals typically comprise a portable computer that includes a display screen attached to a case that includes a keyboard. The display screen selectively displays, for example, a map or plan view that depicts the positions and velocities of radar detected aircraft, or an elevational view that depicts the elevation of radar detected aircraft. An important consideration with known portable weapon computer terminals is the tendency of an operator of a portable weapon terminal to look down into the display screen and to concentrate on the display screen rather than on the surrounding environment. A further consideration known weapon computer terminals is the lack of correlation between the orientation of the displayed views and the orientation of operator.

SUMMARY OF THE INVENTION

It would therefore be an advantage to provide a weapon computer terminal that allows an operator thereof to view the surrounding environment while viewing a display produced by the weapon computer terminal.

Another advantage would be to provide a weapon computer terminal that provides a display having an orientation that is correlated to the physical orientation of the operator and which allows an operator thereof to view the surrounding environment while viewing the display.

The foregoing and other advantages are provided by the invention in a weapon terminal that includes a sensor for sensing an orientation of the head of an operator of the weapon terminal, a heads-up display supported by the head of the weapon terminal operator for providing a display image viewable by the weapon terminal operator, a weapon terminal processor responsive to the sensing means and radar track reports for radar detected aircraft for controlling heads-up display to produce a display image that includes symbols representing the radar detected aircraft, wherein symbols are located at positions that represent the positions of the radar detected aircraft in relation to a direction in which weapon terminal operator is facing.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
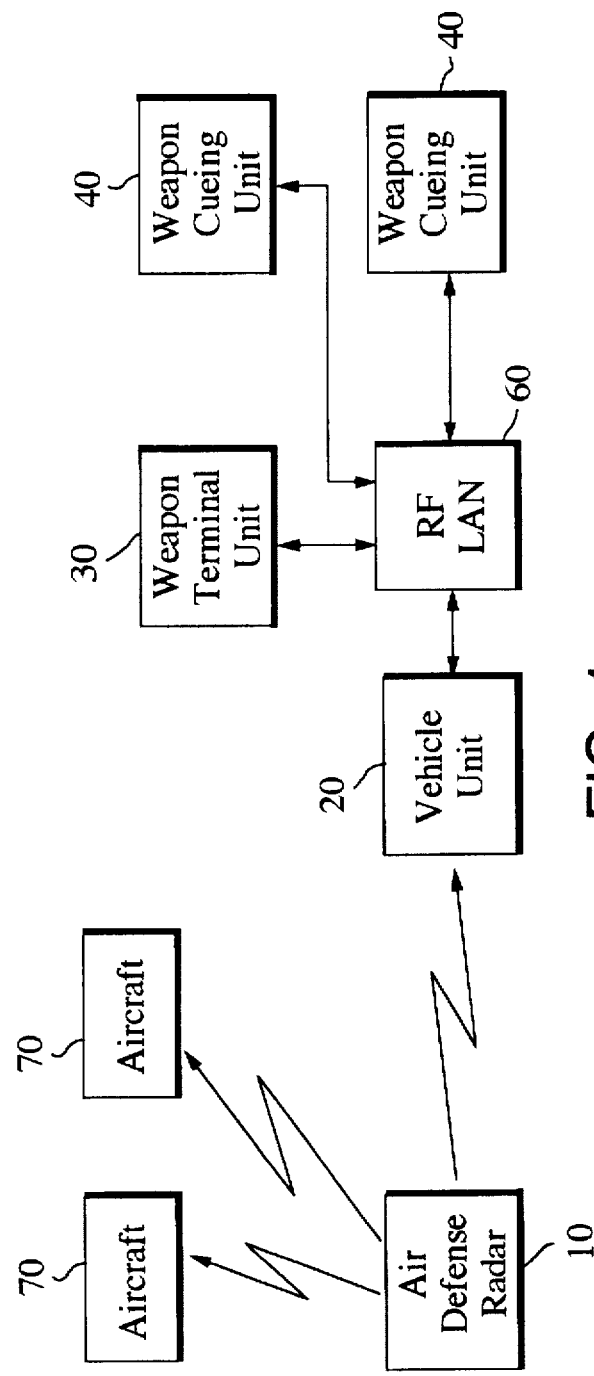
FIG. 1 is a block diagram illustrating a weapon alerting and cueing system in which the weapon terminal of the invention can be implemented.

In the following detailed description and in the several figures of the drawing, like elements are identified with like reference numerals.

Referring now to FIG. 1, set forth therein is a block diagram of a weapon alerting and cueing system in which the weapon terminal of the invention can be implemented. The weapon alerting and cueing system generally includes a vehicle unit 20, a portable weapon computer terminal 30, and a plurality of weapon cueing units 40. The vehicle unit 20, the portable weapon computer terminal 30, and the weapon cueing units 40 are interconnected by a wireless radio frequency (RF) local area network (LAN) 60 which is conventionally comprised of RF modems that transmit and receive RF signals. In particular, a plurality of RF modems are respectively connected to the vehicle unit 20, the portable computer terminal unit 30, and the weapon cueing units 40 for interconnecting such units, whereby such units are interconnected without interconnecting cables. In accordance with conventional RF LAN protocol, data is communicated between the units connected to the RF LAN 60 in the form of messages broadcast on the network by the units, wherein each message includes a message type identification and optionally a destination address that specifies a particular unit connected to the RF LAN 60. All units connected to the RF LAN 60 receive messages broadcast on the RF LAN 60, and each unit is particularly configured to process only messages of selected message types, and/or messages that are of selected message types and which contain the destination address of the particular unit. In other words, each unit is configured to process only selected messages as determined by message type and/or message type and destination address.

The weapon alerting and cueing system receives by radio communications radar track reports provided by an air defense radar system 10 as to a plurality of aircraft 70 that are detected in the region of coverage of the radar system 10. The radar track reports are utilized to cue weapon launchers to selected ones of the aircraft 70 detected by the radar system. For ease of reference, a selected aircraft is sometimes referred to as an aircraft target or a target aircraft. The air defense radar system 10 comprises for example a 3D radar system that provides radar track reports that include position (e.g., easting, northing, and altitude) and velocity information for the detected aircraft relative to a predetermined three-dimensional Cartesian coordinate system. The radar track reports further include the type of the detected aircraft (e.g., fixed wing or rotary wing), and an identification of whether a detected aircraft is hostile, friendly, or unknown. The weapon cueing unit includes for example a cueing sight supported by a weapon launcher and controlled to provide visual weapon launcher pointing cues to an operator of a weapon launcher.

Figure 2:
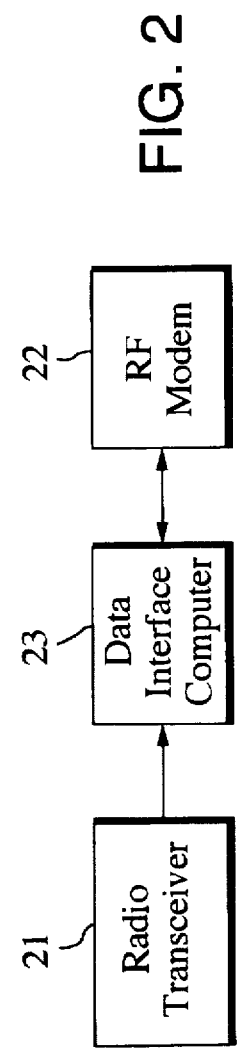
FIG. 2 is a block diagram illustrating the major components of the vehicle unit of the system of FIG. 1.

Referring now to FIG. 2, the vehicle unit 20 more particularly includes a radio transceiver 21 for receiving radar track reports from the air defense radar system 10 and a data interface computer 23 responsive to the radio transceiver. The data interface computer 23 formats the radar track reports into Radar Track Report messages which are provided to an RF modem 22 of the RF LAN 60. The RF modem 22 broadcasts the Radar Track Report messages on the RF LAN 60 so that the Radar Track Report messages can be received by other units in the weapon alerting and cueing system.

Figure 3:
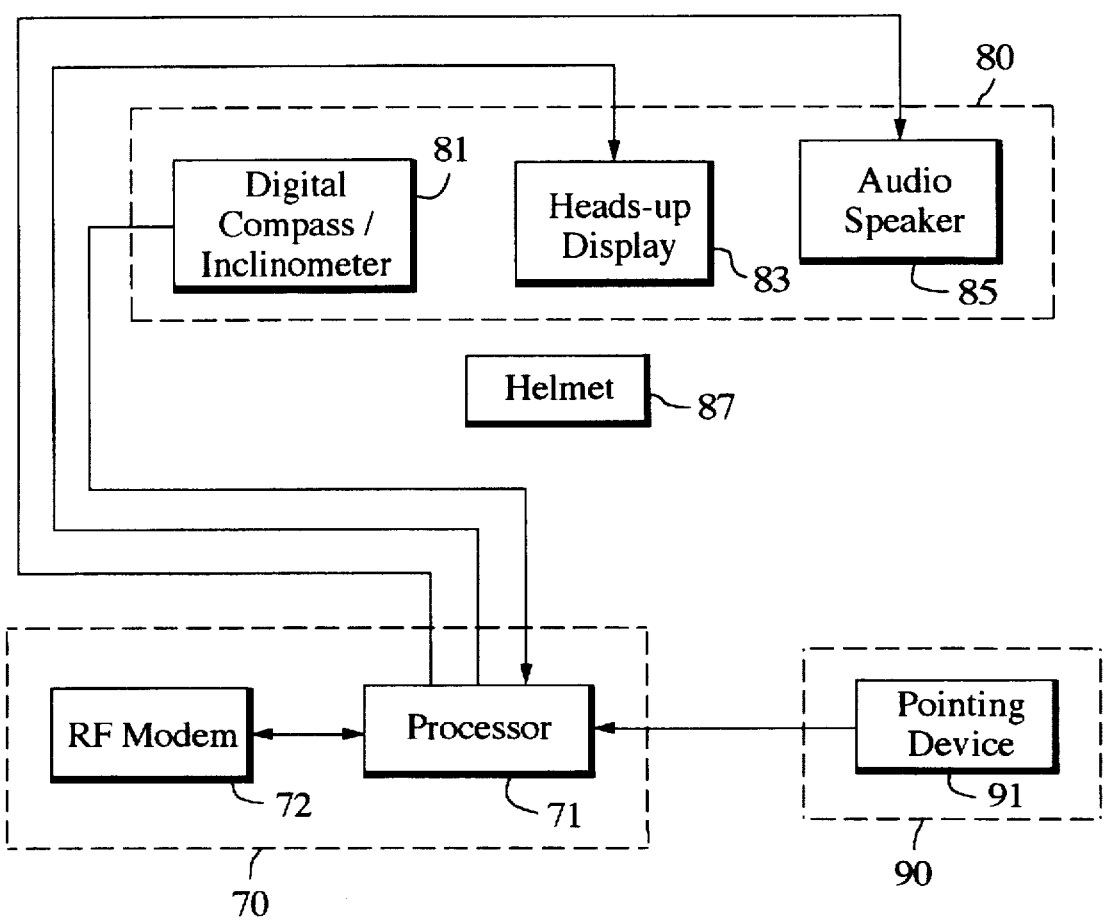
FIG. 3 is a block diagram of an implementation of a weapon computer terminal in accordance with the invention.

Referring now to FIG. 3, set forth therein is a block diagram of an illustrative example of a weapon computer terminal in accordance with the invention which is advantageously utilized in the weapon alerting and cueing system of FIG. 1. The weapon computer terminal generally includes a belt unit 70, helmet unit 80, and a hand-held unit 90.

The belt unit 70 includes a processor 71 and an RF modem 72 that forms part of the RF LAN 60 (FIG. 1), all of which are supported by an equipment belt worn by the operator of the weapon terminal of FIG. 3. The processor 71 receives Radar Track Report messages via the RF modem 72 and causes the helmet unit 80 to produce for the weapon terminal operator graphical images representative of the identification and positions of radar detected aircraft, together with parameter information for the radar detected aircraft. The parameter information of the positions of the radar detected aircraft as well as the graphical depictions of the positions of the radar detected aircraft are referenced to the geographical location of the weapon team utilizing the weapon alerting and cueing system. The RF modem 72 further enables the processor 71 to receive command and control information from other elements in an air defense system in which the weapon terminal is implemented, as well as status information as to weapon cueing units 40. The RF modem 72 also allows the weapon terminal to send responses and status to the air defense system and commands to the weapon cueing units.

The helmet unit 80 includes a digital compass/inclinometer 81, a heads-up display device 83, and an audio speaker 85, all of which are supported by a helmet 87 worn by the operator of the weapon computer terminal. The digital compass/inclinometer 81 provides to the processor 71 data indicative to the azimuth or bearing and inclination or tilt of the helmet 87 by which it is supported. In particular, the digital compass/inclinometer 81 senses the earth's magnetic field to determine the azimuth orientation of the helmet 87 and senses the earth's gravity to determine the inclination of the helmet 87 relative to vertical. Since the helmet 87 is worn by the operator of the weapon computer terminal, the output of the digital compass/inclinometer 81 is indicative of the bearing and inclination of the head of the weapon terminal operator. A digital compass/inclinometer 81 found to be usable in the invention is the Model TCM1 Electronic Compass Module produced by Precision Navigation, Inc., 1350 Pear Avenue, Suite A, Mountain View, Calif. 94043. The heads-up display device 83 is driven by the processor 71 and produces a display image that is perceived by the operator of the weapon computer terminal as being located in front of the operator and is viewable while maintaining visual contact with the surrounding environment. An example of a heads-up display that is usable in the invention is the Private Eye brand display device available from Reflection Technology, 230 Second Avenue, Waltham, Mass. 02154. The Private Eye display device comprises optical elements and electronic elements contained in a small housing that is positioned several inches in front of one eye of the viewer, and produces a display image that appears to float a few feet in front of the viewer. The audio speaker 85 is selectively driven by the processor to produce various audible alerts.

The hand-held unit 90 comprises a pointing device 91, such as a hand-held trackball, which is connected to the processor 71 of the belt unit 70. The pointing device 91 allows the weapon terminal operator to control display image presentations, select air tracks for engagements and initiate engagement commands to the weapon cueing units 40.

In accordance with the invention, the heads-up display device 83, pursuant to display signals from the processor, produces display images that include map or elevational images that depict the positions and velocities of radar detected aircraft, and are oriented to correlate with the orientation of the head of the weapon terminal operator which is detected by the digital compass/inclinometer.

Figure 4:
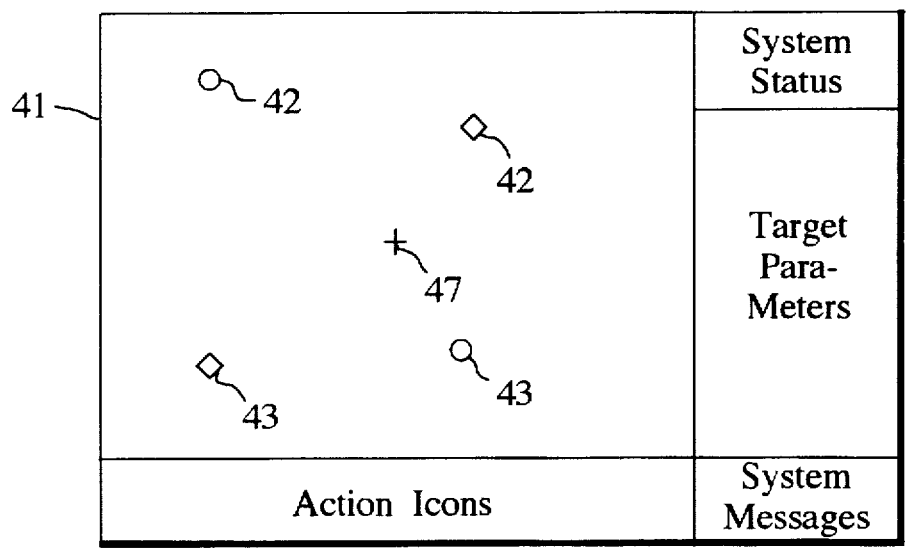
FIG. 4 schematically depicts a map display produced by the weapon computer terminal of FIG. 1.

Referring now to FIG. 4, set forth therein is a schematic depiction of a display image that includes a map or top down image 41 in accordance with the invention. The map image 41 occupies all but the bottom and right side edges of the image display field and includes a plurality of air track symbols 42, 43. The center 47 of the map image 41 corresponds to the geographical location of the weapon terminal operator, and the map image mimics the bearing of the users head (i.e., the direction in which the weapon terminal operator is facing) so that air track symbols 42 that represent aircraft located in front of the head of the weapon terminal operator are located above an imaginary horizontal line that passes through the center 47 of the map image, and air track symbols 43 that represent aircraft located behind the head of the weapon terminal operator are located below the imaginary horizontal line that passes through the center 47 of the map image. The left/right locations of the air track symbols relative to an imaginary vertical line that passes through the center 47 of the map image correspond to the actual left/right locations of the aircraft relative to the bearing of the head of the weapon terminal operator. The display image of FIG. 4 further includes system messages in the lower right corner and system status information in the upper right corner. Target parameters are along the right side between the system messages and the system status information, and action icons are along the bottom of the display field to the left of the system messages.

Figure 5:
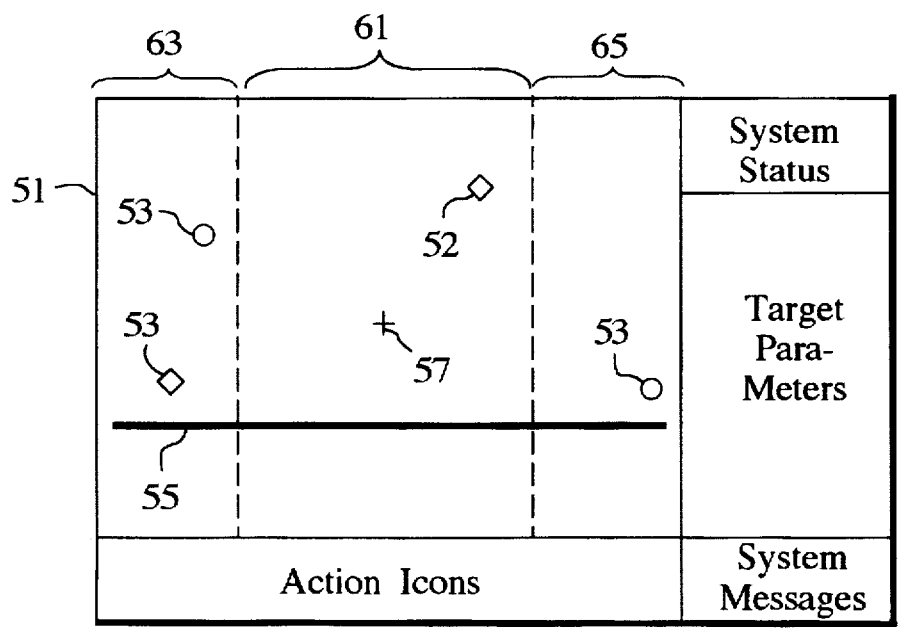
FIG. 5 schematically depicts an elevational display produced by the weapon computer terminal of FIG. 1.

Referring now to FIG. 5, set forth therein is a schematic depiction of a display image that includes an elevational or side-view image 51 in accordance with the invention which provides a schematic pictorial depiction of the horizontal locations of radar detected aircraft. In the elevational image 51, the azimuth positions of radar detected aircraft are represented by the lateral positions of the corresponding air track symbols 52, 53 relative to an imaginary vertical line which passes through the center 57 of the elevational image 51 and represents the bearing of the head of the weapon terminal operator (i.e., the direction in which the weapon terminal operator is facing), whereby an aircraft that is straight ahead of the weapon terminal operator would be represented by an air track symbol located on the imaginary vertical line that passes through the center 57. In particular, the elevational image 51 is divided into three (3) horizontally distinct sections: a center section 61 and lateral sections 63, 65 on either side of the center section 61. The center section 61 has a horizontal dimension that is greater than the horizontal dimension of each of the lateral sections, but the center section represents a field of view that subtends a horizontal angle that is front of the weapon terminal operator and is smaller than each of the fields of view represented by the lateral sections. For example, the center section 61 represents a central 60 degree horizontal field of view in front of the weapon terminal operator (i.e., 30 degrees on either side of straight ahead), and an air track symbol 52 representing a radar detected aircraft within the central 60 degree field of view is displayed in the center section 61. By way of further example, each of the lateral sections 63, 65 represents a lateral 150 degree horizontal field of view on either side of the central 60 degree field of view, and an air track symbol 53 representing a radar detected aircraft within one of the lateral fields of view is displayed in a corresponding one of the lateral sections 63, 65, whereby an air track symbol 53 which represents a radar detected aircraft in the lateral field of view to the left of the central field of view is displayed in the left lateral section 63, and air track symbol 53 which represents a radar detected aircraft in the lateral field of view to the right of the central field of view is displayed in the right lateral section 65. In this manner, radar detected aircraft that are outside the central 60 degree horizontal field of view in front of the weapon terminal operator are represented in a horizontally or laterally compressed form as compared to radar detected aircraft within the central 60 degree horizontal field of view. The elevational image 51 further includes a horizon line 55 that represents the horizontal viewing angle of the weapon terminal operator, and is configured to move down as the head of the weapon terminal operator tilts up relative to horizontal (i.e., the line of sight of the weapon terminal operator is tilted upward relative to horizontal), and to move up as the head of the weapon terminal operator tilts down relative to horizontal (i.e., the line of sight of the weapon terminal operator is tilted down relative to horizontal).

To the extent that the radar track reports contain altitude information, the vertical positions of the air track symbols 52, 53 within the image 51 represent the altitudes of the corresponding radar detected aircraft. Pursuant to altitude information, air track symbols located above the horizon line 55 represent radar detected aircraft having an altitude that is above the altitude of the weapon terminal operator, and air track symbols located below the horizon line 55 represent radar detected aircraft having an altitude that is below the altitude of the weapon terminal operator. If the radar track reports do not contain altitude information, all of the air track symbols are positioned above the horizon line 55 at equal distances from the horizon line 55.

The foregoing has been a disclosure of a weapon computer terminal that allows an operator thereof to view the surrounding environment while viewing a display produced by the weapon computer terminal, and which advantageously provides map and elevation displays that are correlated with the physical orientation of the operator of the weapon computer terminal.

Although the foregoing has been a description and illustration of specific embodiments of the invention, various modifications and changes thereto can be made by persons skilled in the art without departing from the scope and spirit of the invention as defined by the following claim.

What is claimed is:

1. A portable weapon terminal for controlling the deployment and engagement of weapons against airborne targets, comprising:

sensing means for sensing a bearing orientation of the head of an operator of the weapon terminal, the sensing means adapted to be carried by the weapon terminal operator;

display means supported by the head of the weapon terminal operator for providing a display image viewable by the weapon terminal operator while viewing the surrounding environment;

processor means adapted to be carried by the weapon terminal operator and responsive to said sensing means and radar track reports for radar detected aircraft for controlling said display means to produce a display image that includes symbols representing said radar detected aircraft, said symbols being located at positions within an image display field that represent the positions of the radar detected aircraft in relation to a bearing direction in which weapon terminal operator is facing, said display image including an elevational image having a horizon line that represents the horizontal viewing angle of the weapon terminal operator, said elevational image further including (a) a central section having a horizontal dimension and (b) lateral sections horizontally on either side of said central section and having respective horizontal dimensions each being less than the horizontal dimension of said central section, and wherein said central sections represents a central horizontal field of view and said lateral section respectively represent lateral horizontal fields of view on either side of said central horizontal field, said central horizontal field of view being less than each of said lateral horizontal fields of view; and a pointing device adapted to be carried by the weapon operator for allowing the operator to provide interactive signals to the processor for controlling image presentations on said display means.

* * * * *